(12) United States Patent
Crim

(10) Patent No.: US 7,904,335 B2
(45) Date of Patent: Mar. 8, 2011

(54) WEB SITE LEAD GENERATOR

(75) Inventor: Steve Crim, Fairhope, AL (US)

(73) Assignee: C and S Net, Inc., Fairhope, AL (US)

( * ) Notice: Subject to any disclaimer, the term of this patent is extended or adjusted under 35 U.S.C. 154(b) by 866 days.

(21) Appl. No.: 11/465,409

(22) Filed: Aug. 17, 2006

(65) Prior Publication Data

US 2007/0038469 A1   Feb. 15, 2007

Related U.S. Application Data

(60) Provisional application No. 60/822,479, filed on Aug. 15, 2006.

(51) Int. Cl.
*G06Q 30/00* (2006.01)
*G05B 19/418* (2006.01)
(52) U.S. Cl. .......................... 705/14.4; 709/206; 705/26
(58) Field of Classification Search .................. 705/14, 705/26, 14.4; 709/206; 345/146
See application file for complete search history.

(56) References Cited

U.S. PATENT DOCUMENTS

| 5,307,086 | A | * | 4/1994 | Griffin et al. | 715/808 |
| 6,177,936 | B1 | * | 1/2001 | Cragun | 715/760 |
| 7,228,335 | B2 | * | 6/2007 | Caughey | 709/206 |
| 7,386,473 | B2 | * | 6/2008 | Blumenau | 705/26 |
| 2003/0187677 | A1 | * | 10/2003 | Malireddy et al. | 705/1 |

FOREIGN PATENT DOCUMENTS

| JP | 2001265820 A | * | 9/2001 |
| WO | WO 2005089286 A2 | * | 9/2005 |

OTHER PUBLICATIONS

Mastering HTML 4, by Deborah S. Ray and Eric J. Ray, Apr. 5, 1999, pp. 4, 67 and 68.*
JavaScript The complete Reference , by Thomas Powell and Fritz Schneider, 2001,pp. 387 and 388.*
Complete reference Javascript, by Powell and Schneider , 2001, pp. 387-388.*
Stephen Chapman, "Blur", http://javascript.about.com/od/reference/g/sblur.htm, publication date unknown but Applicant admits this command is prior art to application.
Stephen Chapman, "Focus" http://javascript.about.com/od/reference/g/sfocus.htm, publication date unknown but Applicant admits this command is prior art to application.

* cited by examiner

*Primary Examiner* — John G Weiss
*Assistant Examiner* — Victoria Vanderhorst
(74) *Attorney, Agent, or Firm* — Muskin & Cusick LLC

(57) ABSTRACT

An Internet marketing system which can generate a user contact information window in a non-intrusive manner. The user contact information window allows the user to enter his or her contact information, which is then transmitted to the operators of the web site so that they can contact the user at a later time.

5 Claims, 4 Drawing Sheets

WEB SITE LEAD GENERATOR

CROSS REFERENCE TO RELATED APPLICATIONS

This application claims benefit of provisional application 60/822,479, which is incorporated by reference herein in its entirety.

BACKGROUND OF THE INVENTION

1. Field of the Invention

The present inventive concept relates to web sites and more particular to a method of receiving customer contact information.

2. Description of the Related Art

Web sites that sell a product typically try to get a customer to enter their contact information, so they can be contacted at a later time in order to attempt to make a sale. One method that web sites have employed in the past in order to present the user with more information is to generate a pop up window as soon as a user visits a particular site. However, most users find pop up windows annoying and intrusive.

Therefore, what is needed is a way to implement a more effective sales web site that users do not find intrusive.

SUMMARY OF THE INVENTION

It is an aspect of the present invention to provide an effective and non-intrusive method to receive contact information from visitor's of a web site.

The above aspects can also be obtained by a method that includes (a) serving a web page in a first window to a user, the web page containing two or more links; (b) executing a client and/or server side program on the user's computer to associate every link on the web page with a contact information window; (c) receiving a request form the user to visit a chosen link of the two or more links; (d) serving a linked page linked to by the chosen link which opens in the first window; and (e) serving a customer contact information page in a second window which allows the user to enter and transmit contact information entered.

The above aspects can also be obtained by a method that includes (a) serving a web page; and (b) executing a program associated with the web page, the program causing every link that a user can click on the web page to open an additional content window in addition to displaying a linked to web page respective to each link on the web page.

The above aspects can also be obtained by a method that includes (a) serving a web page in a first window to a user, the web page containing a link; (b) executing a program on the user's computer to associate every link on the web page with a contact information window; (c) receiving a request form the user to visit a chosen link of the two or more links; (d) serving a linked page linked to by the chosen link which opens in the first window; and (e) serving a re-entry page in a second window, displayed behind the first window, which contains promotional materials and is not visible to the user until the user closes the first window.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
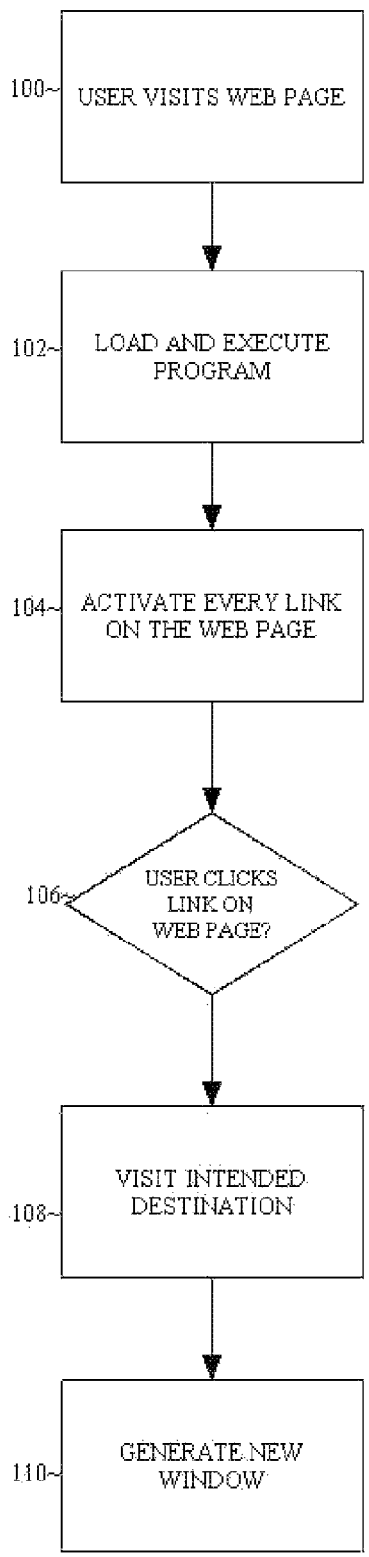
FIG. 1 is a flowchart illustrating an exemplary method of generating a contact info window, according to an embodiment.

Reference will now be made in detail to the presently preferred embodiments of the invention, examples of which are illustrated in the accompanying drawings, wherein like reference numerals refer to like elements throughout.

The present general inventive concept relates to a method, system, and computer readable storage which allows a web site to generate leads in an effective manner. A user visits a particular web page. All the links on the page are then given a special functionality, that is in additional to taking the user to that respective page, clicking any of the links on the page also generates an additional contact information window. The contact information window allows a user to enter his contact information, such as name, email, etc., and it can be transmitted to the owners of the web site the user is visiting. In this manner, the contact information window is generated in a less intrusive manner, as it synchronized with the user clicking a link on the page.

FIG. 1 is a flowchart illustrating an exemplary method of generating a contact info window, according to an embodiment.

The method can start with operation 100, wherein the user visits a particular web page. This can be done as known in the art. The web page is displayed on the user's monitor.

The method can then proceed to operation 102, wherein the user's computer loads and executes the program. The program can be stored on the user's local computer or it can be stored on the server side (the server that serves the user the web site).

The method can then proceed to operation 104, which activates every link on the web page. This is done by the program executing in operation 102, and this causes every link on the page to have a dual functionality: each link will now also bring up a contact information window in additional to bringing the user to the new page that the link points to.

The program activates the surface of an entire html page to become an active hyperlink that produces the desired content and additional window of content. Thus, any link followed on that page will produce the contact information window and the desired destination. Additionally if there is a form field on the page, it can be clicked in and will also produce the contact information window.

From operation 104, the method proceeds to operation 106, which determines if a user has clicked a link on the web page. A user can click a link as known in the art, such as pointing a cursor over a link and clicking it.

If the determination in operation 106 is positive, then the method proceeds to operation 108, wherein the web browser the user is using visits the page that the link the user clicks.

From operation 108, the method proceeds to operation 110, which generates a new window. The new window can be a contact information window wherein the user can enter his or her contact information and submit it so that it can be transmitted to the party selling goods on the web site. The contact information window is also known as a lead generation window, which can deliver a sales lead in real time.

Figure 2:
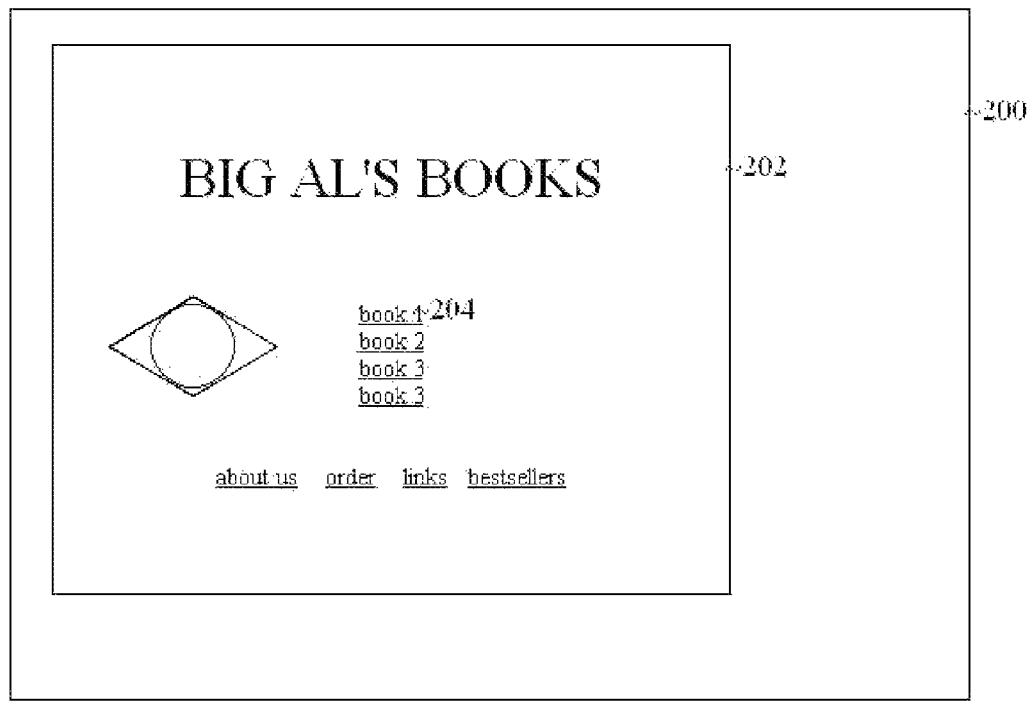
FIG. 2 is a drawing of an output device illustrating a first window, according to an embodiment.

FIG. 2 is a drawing of an output device illustrating a first window, according to an embodiment.

An output display 200 displays all visible windows a user has open. A first web window 202 displays a first web page. The first web page includes a number of links, such as a first link 204 ("book 1"). As well known in the art, links are typically underlined (although not required to be) and take the user to a page pointed to by the link.

Figure 3:
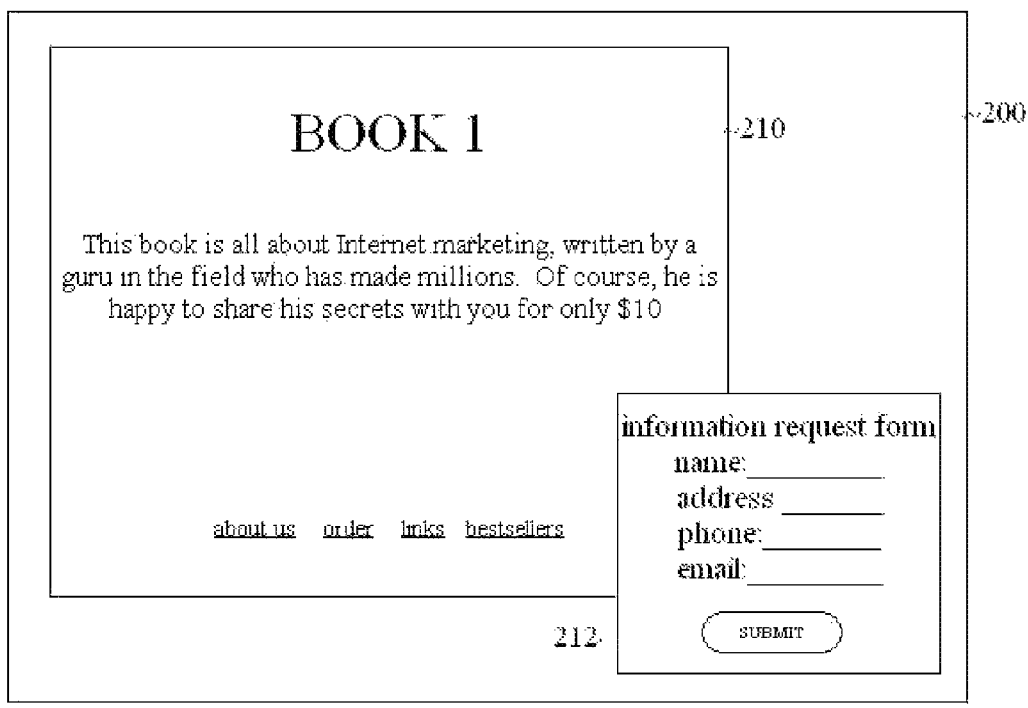
FIG. 3 is a drawing of an output device illustrating a first window and a second window, according to an embodiment.

When the user clicks the first link, the output in FIG. 3 will then be displayed on the same output display 200.

FIG. 3 is a drawing of an output device illustrating a first window and a second window, according to an embodiment.

Since the user clicked the link 204, the first web window 202 now becomes an updated web window 210 and displays a second web page, the page linked to by the first link 204. Also, a contact information page 212 is generated and displayed which allows the user to enter his contact information. He can then press a submit button wherein the contact information is transmitted via the Internet to the web server serving the web pages illustrated herein so the owners can later contact the user by using the contact information submitted.

The contact information page 212 can be generated above (visible) the first web window 202 or below the first web window 202. Below means that the contact information page 212 will not be visible until the user closes (or moves) the updated web window 210 to reveal the contact information page 212.

Each link on the first web window 202 would have a similar effect that is causing the page respective to link to display as well as generating the same contact information page 212.

While the first web page, the second page, and the contact information page can all be served by the same server, some or all of these pages can be served by different servers. When the contact information is entered into the contact information page, it cal also be submitted to any of the servers that are serving content for the web page, or alternatively an entirely different server. The server the contact information is received and stored on should nevertheless ultimately be accessible (or contact information transmitted to) operators of the web site so that they can act on the leads generated.

It is noted that since the contact information page is generated at the same time that the user clicks a link on a page implementing the method described herein, the contact information window that is generated can be considered less intrusive than a standard pop up window (which can be generated when a user first visits a web site). In the case of the current method, a user can first visit a web site (and no contact information window is generated), but when the user visits a linked to page on that web site, the contact information window can then be generated. If the user is clicking a link on a web page, the user is presumably must be interested in the content and thus the contact information page can be presented to the user.

The purpose of the invention is to be able to deliver additional information through a new browser window without disrupting the original destination or window. The code written in a client side language turns all of the active html links on a web page into a delivery system for the new information. When a link is followed the code tells the computer to generate a new browser window which is filled with content from the same server as the original page or from any other server. It also allows the original destination to be reached uninterrupted. The code also allows for clicking on non-link areas such as form fields. When clicking on a form field and other non-active elements the code still generates the additional browser window and restricts the delivery to one time in a browser session.

Moreover, instead of generating a contact information window as described herein, an informational window can be generated instead. The informational window would not receive contact information but would present sales information to the user relating to the subject matter of the particular web site being visited. The sales information can for example comprise pictures, specifications, prices, contact information of the seller, etc.

This method can be used in the context of selling automobiles, recreational vehicles, motorcycles, ATVs, snowmobiles, real estate, insurance, wedding planners, travel, and any other industries.

In yet a further embodiment, a "re-entry" page can be placed behind the website, thereby ensuring that the re-entry page will be the last thing a user will see when the user closes out a web page. A user can visit a first (typically splash) page, then click a link and visit a second page (displayed in a second window), and then close out the second window (typically by clicking an "X" in the upper right of the window). Behind the second window, is the "re-entry" page, which provides the user yet an additional sales pitch. This alternative embodiment will be illustrated by the examples depicted in FIGS. 4-6, which would all typically occur in sequence.

Figure 4:
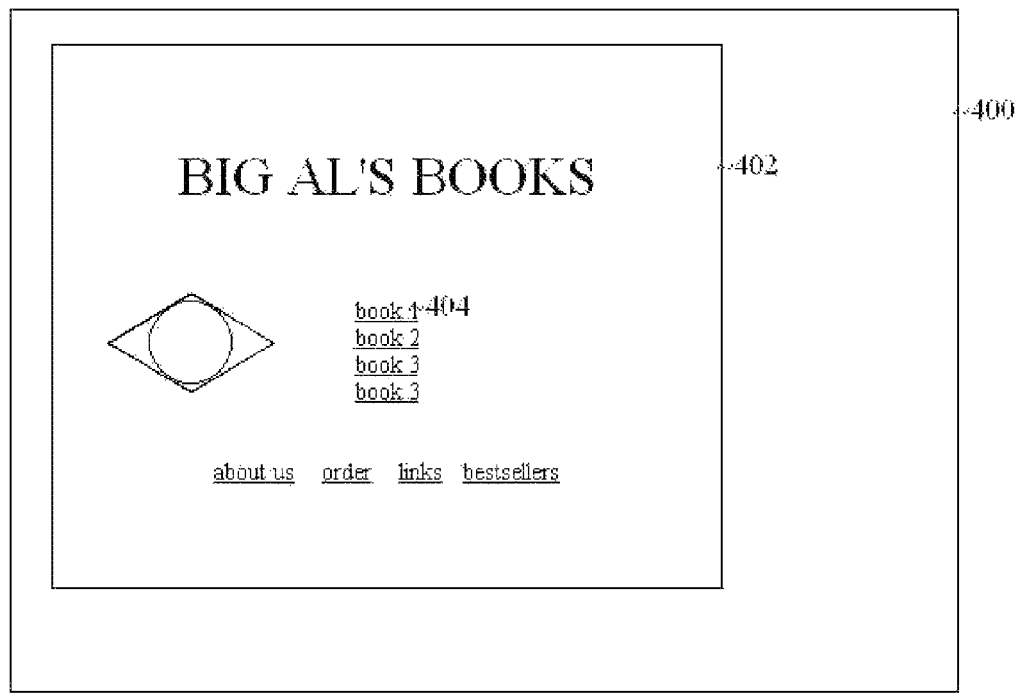
FIG. 4 is a drawing of a first screen image of an alternative embodiment.

FIG. 4 is a drawing of a first screen image of an alternative embodiment.

An output device 400 displays a first window 402 which displays a first web page. A first link 404 is displayed out of many other links. A user clicks the first link 404, which then brings up what is illustrated in FIG. 5.

Figure 5:
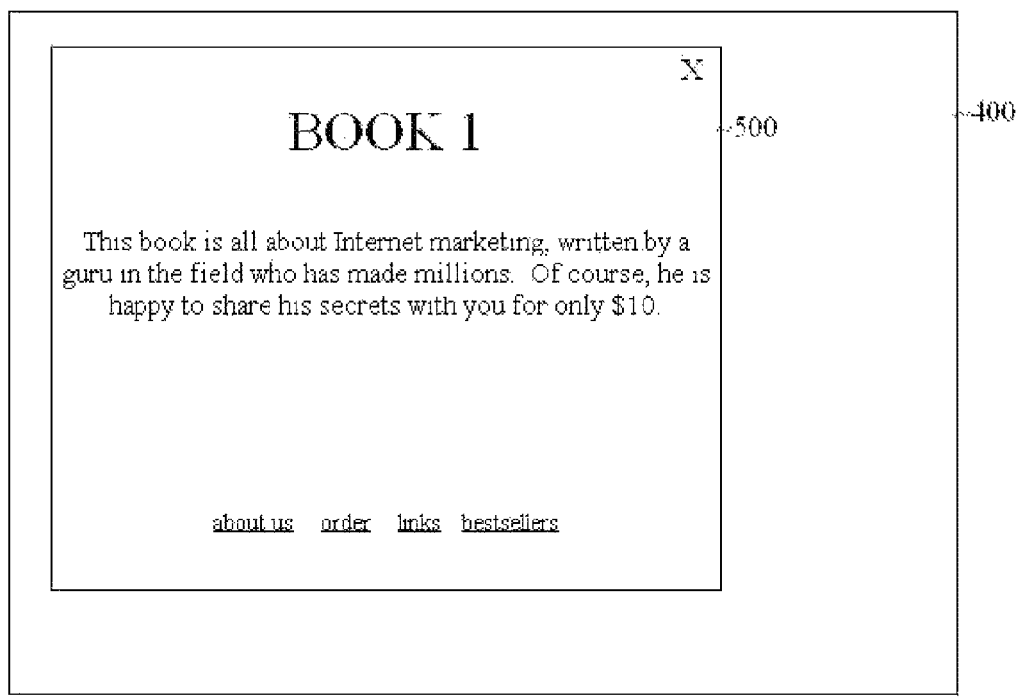
FIG. 5 is a drawing of a second screen image of the alternative embodiment.

FIG. 5 is a drawing of a second screen image of the alternative embodiment.

A second window 500 displays a second web page, which was linked to the by first link ("book 1"). Now, the user closes the second window 500 (typically by clicking an "X" in the upper right of this window). This brings up what is illustrated in FIG. 6.

Figure 6:
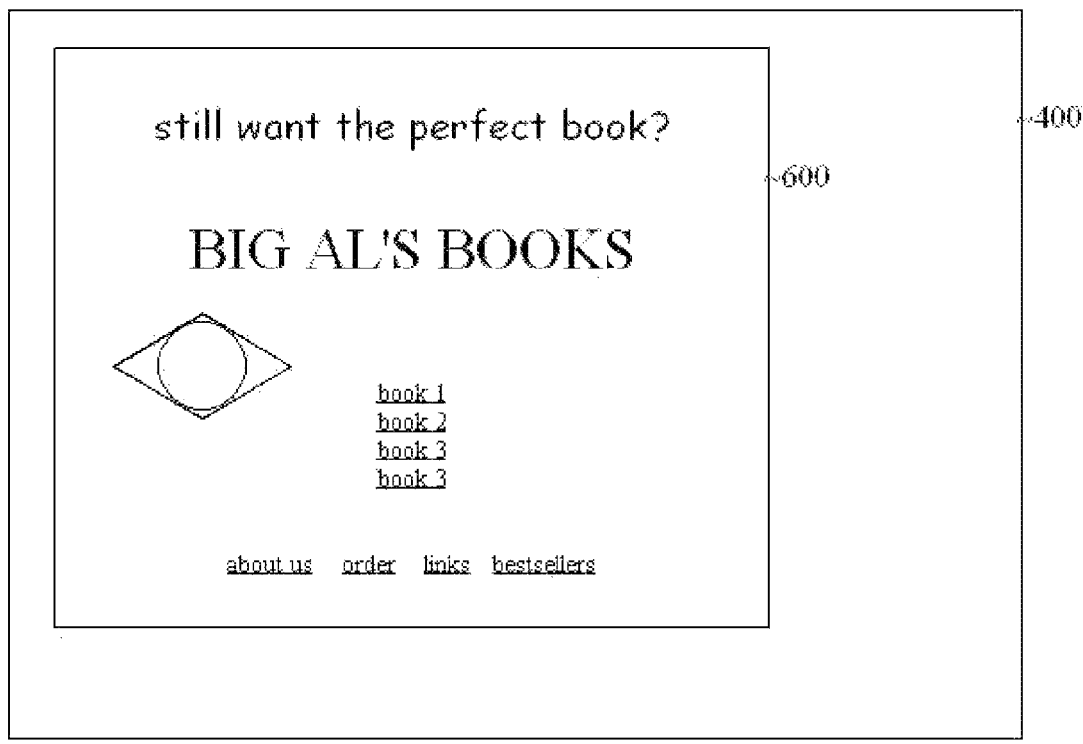
FIG. 6 is a drawing of a third screen image of the alternative embodiment.

FIG. 6 is a drawing of a third screen image of the alternative embodiment.

A "re-entry" window 600 was displayed behind the second window 500 and was not visible to the user until the user closed the second window 500. The re-entry window 600 provides an additional sales pitch to the user. The re-entry window can either be generated when the user closes out the second window, or can be generated when the user clicked the link in the first window (since it is generated behind the second window the user will not know it has been generated until the user has closed the second window).

One method the alternative embodiment illustrated in FIGS. 4-6 and described herein can be implemented is similar to the implementation of the earlier embodiments presented herein, however the re-entry window is generated when a link is clicked and appears behind the second web page.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Appendix A contains one example of a client and/or server side program that can be used to implement methods described herein, although of course it is appreciated that the methods described herein can be implemented in many other languages and fashions. This is presented merely as just one example.

APPENDIX A

```
<!--
// edit these 3 values only
var desired_width = 900;
var desired_height = 600;
var popup_URL = 'http://www.autoleadsystems.com/1stc/[T2]/2ndchance/index.html'; // note the
single quotation marks around the URL
// do not edit anything below here (you can remove the comments if you like)
popNotOpenedYet = true;
document.onclick = function( ) {
if (document.cookie.indexOf("popopened2=") != −1) { popNotOpenedYet = false; }
if(popNotOpenedYet) {
var pop_left = 0; var pop_width = desired_width;
if (screen.availWidth > desired_width) {
var left_offset = 0; var use_width = screen.width;
if (screen.availLeft != null) {
left_offset = screen.availLeft;
use_width = screen.availWidth;
}
pop_left = {(use_width − desired_width) / 2} + left_offset;
} else {
pop_width = screen.availWidth;
}
var pop_top = 0; var pop_height = desired_height;
if (screen.availHeight > desired_height) {
var top_offset = 0; var use_height = screen.height;
if (screen.availTop != null) {
top_offset = screen.availTop;
use_height = screen.availHeight;
}
pop_top = ((use_height − desired_height) / 2) + top_offset;
} else {
pop_height = screen.availHeight;
}
var winprops =
'width='+pop_width+',height='+pop_height+',top='+pop_top+',left='+pop_left+',toolbar=1,menubar
=1,scrollbars=1,status=1,location=0,resizable=1';
popwinOBJ = window.open(popup_URL, "VarsizeViewer", winprops);
popwinOBJ.blur( );
popNotOpenedYet = false;
document.cookie = "popopened2=1";
}
}
//-->
```

Line by Line Explanation:
1) This is an HTML comment opening tag. It prevents older web browsers from interpreting the script as text and displaying them.
2) This is a JavaScript line comment instructing the person who installs this script to edit lines 3 through 5 inclusive.
3) This is where the person who installs the script sets the width, measured in pixels (units of computer monitor display width and height).
4) This is where the person who installs the script sets the height, measured in pixels.
5) This is where the person who installs the script sets the URL which will be displayed in the popup window.
6) A blank line used to aid in code readability.
7) This is a JavaScript line comment instructing the person who installs this script not to change anything on any of the lines below.
8) Keep track of whether or not a new window has been opened by the script. Initially the answer is no.
9) This tells the web browser that any mouse click, anywhere on the webpage, causes the popup code to run. The right hand curly brace is the beginning of the popup code.
10) This checks to see if there is a cookie named "popopened2" associated with the page. If there is, then the popup code has been run before (by a previous mouse click on the webpage), so we change the value of the tracking variable to indicate that it has.
11) This is a conditional test which check if the popup code has run before. If the answer is no, the code from lines 11 to 41 inclusive will run. If the answer is yes, the script will do nothing. The right hand curly brace is the beginning of the block of code which actually opens the new window.
12) This sets the initial value of two variables which determine how far from the left edge of the monitor the new window will open and how wide it will be. Both measurements are in pixels.
13) This is a conditional test which determines if the users monitor is set to a high enough resolution to display the window at the width set by the person who installs the script on line 3. The right curly brace indicates the start of a block of code which will run if the desired width of the popup window is indeed less than the width Of the monitor.
14) This sets the initial value of two variables which determine how far (in pixels) from the left edge of the monitor the popup window will be, and the width used in the horizontal centering calculation on line 19.

15) This is a conditional test which determines if the web browser is able to determine the left edge of the viewable area of the monitor. The viewable area takes into account, for example, the taskbar on Windows systems. The left edge may or may not be available depending on which web browser is being used. The left curly brace begins the block of code which will run if it is possible to determine the left edge.

16) This updates the left edge variable initially set on line 14 to the viewable left edge.

17) This updates the width used in the horizontal centering calculation on line 19 which was initially set on line 14.

18) This right curly brace ends the block of code which began on line 15.

19) This is the horizontal centering calculation. It updates the left side coordinate of the popup window which was initially set on line 12.

20) This right curly brace ends the block of code which began on line 13. A second block of code is begun by the left curly brace which will run if the conditional test on line 13 indicates that the desired width of the popup window is actually greater (wider) than the width of the monitor.

21) This sets the width of the popup window to the same width as the monitor.

22) This right curly brace ends the block of code which began on line 20.

23) A blank line used to aid in code readability.

24) This sets the initial value of two variables which determine how far from the top edge of the monitor the new window will open and how tall it will be. Both measurements are in pixels.

25) This is a conditional test which determines if the users monitor is set to a high enough resolution to display the window at the height set by the person who installs the script on line 4. The right curly brace indicates the start of a block of code which will run if the desired height of the popup window is indeed less than the height of the monitor.

26) This sets the initial value of two variables which determine now far (in pixels) from the top edge of the monitor the popup window will be, and the height used in the vertical centering calculation on line 31.

27) This is a conditional test which determines if the web browser is able to determine the top edge of the viewable area of the monitor. The top edge may or may not be available depending on which web browser is being used. The left curly brace begins the block of code which will run if it is possible to determine the top edge.

28) This updates the top edge variable initially set on line 26 to the viewable top edge.

29) This updates the height used in the vertical centering calculation on line 31 which was initially set on line 26.

30) This right curly brace ends the block of code which began on line 27.

31) This is the vertical centering calculation. It updates the top side coordinate of the popup window which was initially set on line 24.

32) This right curly brace ends the block of code which began on line 25. A second block of code is begun by the left curly brace which will run if the conditional test on line 25 indicates that the desired height of the popup window is actually greater (taller) than the height of the monitor.

33) This sets the height of the popup window to the same height as the monitor.

34) This right curly brace ends the block of code which began on line 32.

35) A blank line used to aid in code readability.

36) This takes all the values previously calculated and stores them in a single variable which will be used on the next line.

37) This line opens the new window and tells the new window to load the URL provided. It also controls properties of the new window such as its position and size on the screen, whether it has a toolbar, scrollbars, status bar or not, and whether the user is able to resize it. It also returns a reference which can be used by the rest of the code to access the new window.

38) The reference to the new window is used to tell the new window to display itself below all other open windows, including other software which is currently running on the user's computer.

39) This sets the tracking variable which is checked on line 11 to yes, indicating that the popup code has been run.

40) This tells the web browser to associate a cookie named "popopened2" with this page. This is the cookie that is looked for on line 10.

41) The left curly brace indicates the end of the block of code which began with the conditional test on line 11.

42) The left curly brace indicates the end of the popup code which began on line 9.

43) This is an HTML comment closing tag. It indicated the end of the HTML comment which Began on line 1.

What is claimed is:

1. A method to generate customer contact information, the method comprising:
    serving a web page in a first window to a user, the web page containing two or more links;
    loading a program on the user's computer to associate every link on the web page with a contact information window;
    receiving a request from the user to visit a chosen link of the two or more links;
    serving a linked page linked to by the chosen link which opens in the first window; and
    executing simultaneously the program which serves a customer contact information page which opens in a second window which allows the user to enter and transmit contact information entered.

2. The method as recited in claim 1, further comprising:
    receiving contact information that was filled in by the user on the customer contact information page; and
    storing the contact information into a database maintained by an operator of the web page.

3. The method as recited in claim 1, wherein the second window appears over the first window.

4. The method as recited in claim 1, wherein the second window appears behind the first window, and is visible to the user when the user closes the first window.

5. The method as recited in claim 1, wherein the customer contact information page also contains sales information related to content on the web page.

* * * * *